United States Patent Office 3,464,510
Patented Sept. 2, 1969

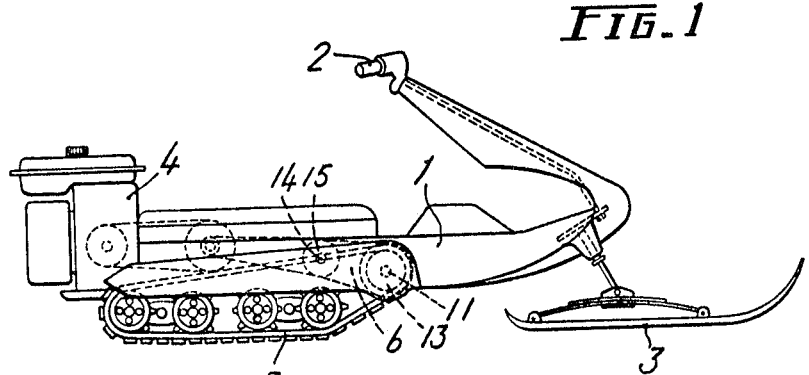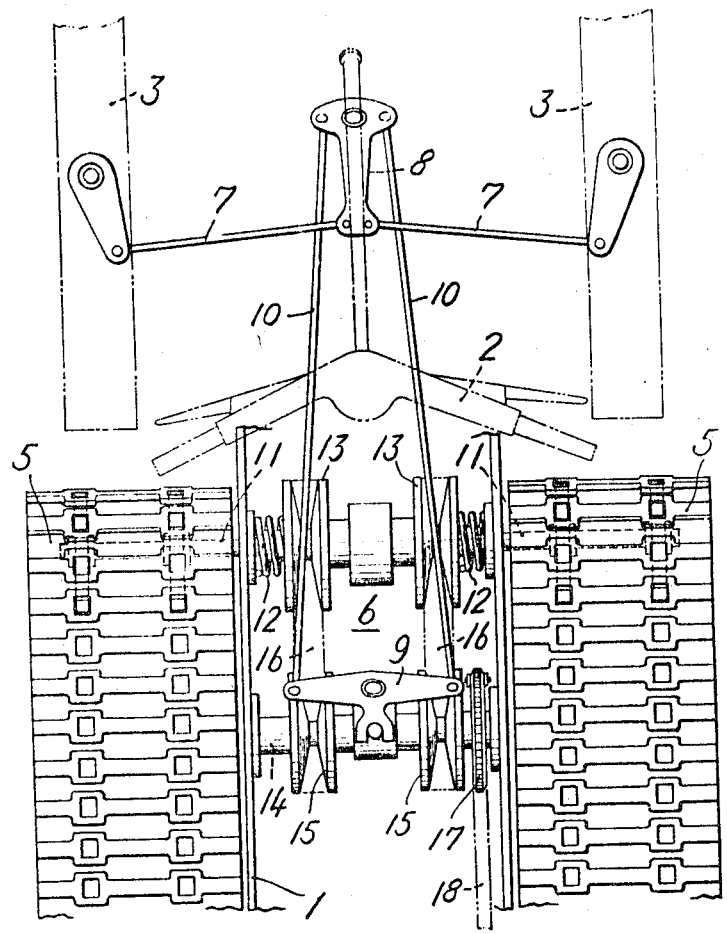

3,464,510
STEERING APPARATUS FOR AN ENDLESS
TRACK VEHICLE
Yoshikazu Washizawa, Kita-Adachi-gun, Saitama-ken,
and Hiroto Matsuzawa, Iruma-gun, Saitama-ken,
Japan, assignors to Kabushiki Kaisha Honda Gijutsu
Kenkyusho, Saitama-ken, Japan
Filed June 7, 1967, Ser. No. 644,316
Claims priority, application Japan, June 7, 1966,
41/52,879
Int. Cl. B62m 27/02; B62d 11/12
U.S. Cl. 180—5                                                      7 Claims

ABSTRACT OF THE DISCLOSURE

A steering apparatus in which a first pair of V pulleys is mounted on an input shaft and drives a second pair of V pulleys each on a respective output shaft coupled to an endless track wheel, one of the pairs of V pulleys having adjustable half portions, one of each of which is coupled together and operated by a steering handle such that the effective diameter of one pulley of said pair increases and the other decreases whereby the speed of one track wheel is increased and the other decreased thereby producing turning of the vehicle.

BRIEF SUMMARY OF THE INVENTION

The present invention relates to a steering apparatus for an endless track vehicle such as a snowmobile for running on snow, sand or the like.

According to the present invention, there is provided a novel steering apparatus for an endless track vehicle characterized in that right and left variable diameter V pulleys mounted on a common input shaft driven by a prime mover are connected through respective V belts to right and left variable diameter V pulleys mounted respectively on right and left separate output shafts connected to respective right and left track wheels, the two V pulleys on either the input side or the output side being connected to a steering handle to be controlled thereby such that when the handle is operated, one of the two pulleys is increased in effective diameter and the other is decreased in effective diameter, whereby the right and the left track wheels are differentiated in rotating speed one from another to produce turning of the vehicle.

BRIEF DESCRIPTION OF THE DRAWING

FIGURE 1 is a side view of a vehicle with a steering apparatus according to the present invention;

FIGURE 2 is an enlarged top plan view of a principal portion of the steering apparatus of FIG. 1.

DETAILED DESCRIPTION

Figure 3:
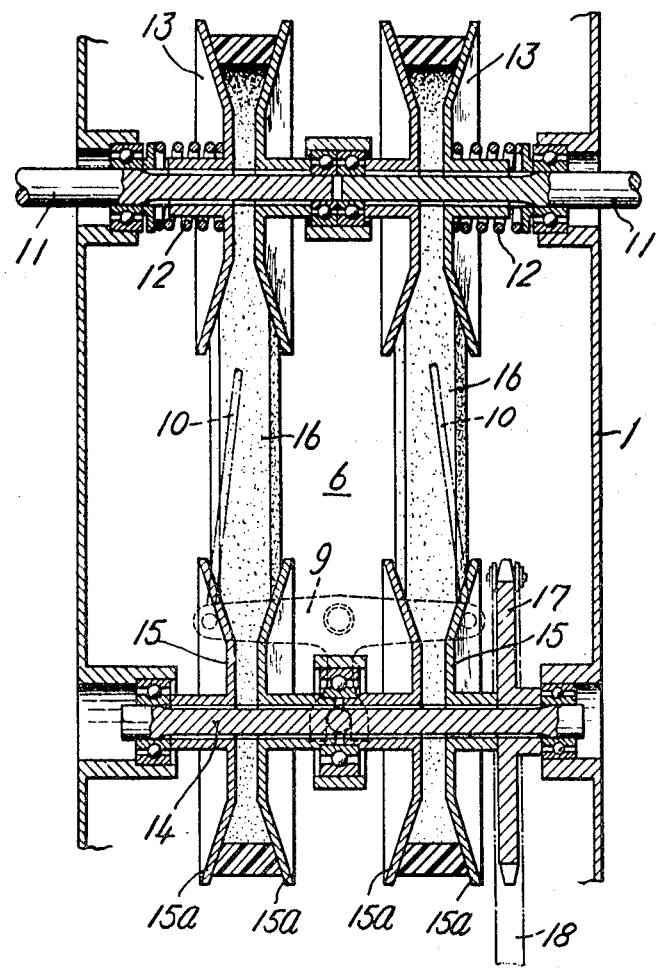
FIGURE 3 is an enlarged sectional plan view of a portion of FIG. 2.

Numeral 1 denotes a vehicle body which is provided at its front portion with a pair of sliding plates 3 turnable to the right and the left by a steering handle 2 and at its rear portion with right and left endless track wheels 5 driven by a prime mover 4 such as an internal combustion engine, there being interposed between the track wheels 5 and the prime mover 4 a differential apparatus 6 operable by the turning of the steering handle 2, as will be explained more in detail hereinafter.

In the illustrated embodiment, as seen best in FIG. 2, the sliding plates 3 are arranged parallel to one another and these two plates are connected through respective links 7 to an arm 8 projecting from the steering handle 2. The differential apparatus 6 has a control lever 9 with opposite ends connected through respective wires 10 to the arm 8 projecting from the handle 2.

The differential apparatus 6 is constructed such that one of the right and left output shafts 11, and thereby one of the right and the left endless track wheels 5 connected thereto, is increased in speed and the other is decreased in speed when the control lever 9 is turned in one direction, whereas the former wheel is decreased in speed and the latter wheel is increased in speed when the lever 9 is turned in the other or reverse direction. The construction of the differential apparatus 6 will be explained in detail with reference to FIG. 3. Therein, it is seen that the apparatus 6 is constructed with right and left variable V-pulleys 13 mounted on the right and left separate output shafts 11. The pulleys 13 are each constituted by an axially fixed half portion and an axially displaceable half portion, the latter facing outwardly on shaft 11 and being urged inwards by a spring 12. The pulleys 13 are connected through respective V belts 16 with respective right and left variable V-pulleys 15 mounted on a common input shaft 14. The construction of pulleys 15 is similar to that of pulleys 13 except that both the inner half portions 15a of the two pulleys 15 on the input shaft 14 are connected together to be integrally moved axially right and left by the lever 9 on the shaft 14. If the lever 9 is moved to the right in the drawing, the pulley half portions of the right hand V-pulley 15 are moved closer together and pulley 15 is increased in effective diameter to increase the speed of the right hand output shaft 11, and at the same time the left hand V-pulley 15 is decreased in effective diameter to decrease the speed of the left hand output shaft 11. On the other hand, if the lever 9 is moved to the left, the above change in pulley diameters is reversed. The input shaft 14 is connected by a sprocket 17 secured thereto to the prime mover 4 through a chain 18.

The operation of the apparatus is as follows:

If the steering handle 2 is turned to the right in order to turn the vehicle body 1 to the right, the differential apparatus 6 is operated so that the right hand track wheel 5 is decreased in speed and the left hand track wheel 5 is increased in speed so that the vehicle 1 is rapidly turned to the right by the speed difference between the two wheels 5, whereas if the steering handle 2 is turned to the left for the purpose of turning the vehicle to the left, the differential apparatus 6 is operated in reverse to that indicated above whereby the left hand track wheel 5 is decreased in speed and the right hand wheel is increased in speed so that the vehicle is turned rapidly to the left.

The above embodiment can be modified by interchanging the two V-pulleys 13 and the two V-pulleys 15 and by placing the control lever 9 on the output shaft so that the operation by the steering handle may be effected on the pulleys on the output shaft. The two pulleys 15 in this case, must be so arranged that the inner half portions thereof are connected together for common axial displacement but are rotatable independently of one another.

Thus, according to the present invention, the right and the left endless track wheels 5 are differentiated in rotating speed continuously and without steps by the action of the differential apparatus operated by the steering handle 2 so that change of direction of the vehicle can be effected smoothly without shock and at high efficiency, while the apparatus may be comparatively simple in construction and economical in manufacturing costs.

What is claimed is:

1. A steering apparatus for a vehicle having left and right endless track wheels and a prime mover for driving the wheels, said apparatus comprising an input shaft driven by the prime mover, right and left output shafts coupled to a respective track wheel for driving the same, a first pair of V pulleys mounted on a respective output shaft, belts connecting the pulleys on the input shaft with corresponding pulleys on the output shafts, the pulleys of one of said pairs having a variable effective diameter, steering control means coupled to the pulleys of said one pair for changing the diameters thereof such that one increases and the other decreases whereby the speed of one track wheel is increased and the other decreased thereby producing turning of the vehicle, and left and right sliding plates disposed in front of the left and right track wheels, said steering control means including means coupled to the sliding plates to turn the same in common with the speed variation of the two track wheels so that turning of the vehicle is produced both by the speed variation of the wheels and the turning of the sliding plates, a steering handle turnable in opposite directions, an arm coupled to said handle for turning therewith, link means coupled to said arm and the sliding plates to turn the latter in response to turning of said arm, and means connecting the arm to the pulleys of said one pair.

2. A steering apparatus as claimed in claim 1 wherein each pulley includes first and second half portions, one of the half portions of the two pulleys of said one pair being coupled together by said means connected to the steering handle such that the half portions are displaced in common by operation of said steering handle.

3. A steering apparatus as claimed in claim 2 wherein said means connecting the steering handle with respective half portions of the pulleys of said one pair comprises a displaceable control lever connected to the steering handle and to each of said respective half portions.

4. A steering apparatus as claimed in claim 3 wherein the pulleys of said one pair face one another such that opposite half portions of the pulleys of said one pair face inwards towards one another and the other half portions face outwards away from one another, the inwardly facing half portions of the pulleys being coupled to said control lever for common displacement axially with respect to the outwardly facing half portions.

5. A steering apparatus as claimed in claim 4 wherein the pulleys of said one pair are mounted coaxially on the input shaft, said control lever being slidably mounted on said input shaft.

6. A steering apparatus as claimed in claim 2 wherein the pulleys of the other pair have respective half portions, the apparatus further comprising spring means acting on respective half portions of the pulleys of the other pair for maintaining the effective diameter of the latter pulleys constant while permitting displacement thereof along their associated shaft.

7. A steering apparatus as claimed in claim 6 wherein the spring means comprises a spring acting on the outer half portions of said other pair urging the same inwardly, the inner portions being in abutment and spaced a constant distance apart.

References Cited

UNITED STATES PATENTS

| 2,529,489 | 11/1950 | Curtis. | |
| 3,077,238 | 2/1963 | Nelson | 180—5 |
| 3,140,752 | 7/1964 | Feu | 180—5 |
| 3,190,385 | 6/1965 | Allport | 180—6.66 |

FOREIGN PATENTS

| 167,848 | 4/1954 | Australia. |
| 484,143 | 6/1952 | Canada. |
| 1,145,553 | 5/1957 | France. |

BENJAMIN HERSH, Primary Examiner

JOHN A. PEKAR, Assistant Examiner

U.S. Cl. X.R.

180—6.7, 6.26